United States Patent

Miyasaka et al.

Patent Number: 5,275,893
Date of Patent: Jan. 4, 1994

[54] LINE PIPE HAVING GOOD CORROSION-RESISTANCE AND WELDABILITY

[75] Inventors: Akihiro Miyasaka; Motofumi Koyuba, both of Toukai, Japan

[73] Assignee: Nippon Steel Corporation, Tokyo, Japan

[21] Appl. No.: 987,218

[22] Filed: Dec. 8, 1992

[30] Foreign Application Priority Data

Dec. 11, 1991 [JP] Japan ................... 3-327254
Dec. 11, 1991 [JP] Japan ................... 3-327255

[51] Int. Cl.$^5$ ............. B32B 15/18; F16L 9/02; F16L 9/18
[52] U.S. Cl. .................. 428/683; 428/685; 138/142; 138/143
[58] Field of Search ............ 428/683, 685; 138/142, 138/143, DIG. 6

[56] References Cited

U.S. PATENT DOCUMENTS

| | | | |
|---|---|---|---|
| 3,712,317 | 1/1973 | Hayashi et al. | 428/683 |
| 3,770,394 | 11/1973 | Bressundli | 428/685 |
| 3,832,136 | 8/1974 | Ohara et al. | 428/683 |
| 3,956,809 | 5/1976 | Chivinsky | 428/685 |
| 4,464,209 | 8/1984 | Taira et al. | 428/683 |
| 4,943,489 | 7/1990 | Kuhara et al. | 428/685 |

FOREIGN PATENT DOCUMENTS 52-23557 2/1977 Japan ............... 138/DIG. 6
737885 10/1955 United Kingdom ........ 428/683

OTHER PUBLICATIONS

U.S. Pipe–Industrial Products Division, Burlington, NJ, brochure 1981, pp. 1–32.

Primary Examiner—John Zimmerman
Attorney, Agent, or Firm—Wenderoth, Lind & Ponack

[57] ABSTRACT

Line pipe having good corrosion-resistance and weldability, in which at least the inner surface of the pipe that is in direct contact with the fluid moved through the pipe is formed of high chromium steel that contains, by weight percent, 7.5 to 16 percent chromium, a carbon content reduced to no more than 0.03 percent and a nitrogen content reduced to no more than 0.02 percent, and a substrate that is not in direct contact with the fluid and is formed of steel that contains 0.02 to 0.25 percent carbon, 0.1 to 1.0 percent silicon, 0.05 to 2.0 percent manganese and 0.005 to 0.1 percent aluminum, a phosphorus impurity content reduced to no more than 0.015 percent and a sulfur impurity content reduced to no more than 0.005 percent, and in which the thickness of the high chromium steel portion does not exceed 25 percent of the total thickness of the pipe.

8 Claims, No Drawings

LINE PIPE HAVING GOOD CORROSION-RESISTANCE AND WELDABILITY

BACKGROUND OF THE INVENTION

1. Field of the Invention

This invention relates to line pipe that has good weldability and corrosion-resistance, and more particularly to steel pipe used to transport oil and natural gas, for example, the steel pipe having good resistance to corrosion in an environment that contains wet carbon dioxide and small amounts of wet hydrogen sulfide and the like, and good weldability with respect to circumferential welds performed in the field.

2. Description of the Prior Art

In recent years there has been an increase in the production of oil and natural gas containing wet carbon dioxide and wet hydrogen sulfide. It is a known fact that in such an environment there is marked corrosion of carbon and low alloy steels. To prevent corrosion of line pipe owing to the transportation of oil or natural gas, the normal practice has been to add corrosion inhibitors.

However, in the case of marine pipelines it is very costly to add and recover corrosion inhibitors, and the risk of pollution of the marine environment is also making it increasingly difficult to use corrosion inhibitors. As a result, there is a major need for corrosion-resistant materials that do not require the addition of a corrosion inhibitor.

The use of stainless steel as a corrosion resistant material for applications involving oil and natural gas containing large amounts of carbon dioxide gas is being studied. As described by L. J. Klein in paper number 211 of Corrosion '84, martensitic stainless steels having a carbon content of around 0.2 percent and a chromium content of 12 or 13 percent are widely used as a high strength, relatively low-cost steel, AISI Type 420 steel being a typical example. However, a relatively high carbon content is needed to provide such steels with the necessary strength.

Pipelines are constructed by welding sections of pipe together in the field, but using the usual methods to weld this type of relatively high carbon martensitic stainless steel results in a marked increase in the hardness of the welding heat-affected zones and a degradation in the impact toughness. In addition, when the fluid being transported contains hydrogen sulfide, the increase in the hardness of welding heat-affected zones increases the risk of sulfide stress cracking, thereby degrading the safety of the line pipe.

Following the welding, the hardness of the welding heat-affected zones can be decreased and the toughness improved to some extent by the application of post-weld heat treatment involving heating the steel to at least 600° C. In practice, however, temperature control and quality assurance requirements make it difficult and extremely costly to apply post-weld heat treatment to a line pipe under construction. Thus, there is a need for line pipe that can be welded by normal welding methods without causing much increase in the hardness of zones affected by the heat of the welding, and which also exhibits good low-temperature impact toughness, both at the welding heat-affected zones and of the base metal.

While a reduction in the carbon content of martensitic stainless steels can mitigate the increase in the hardness of the welding heat-affected zones, the resultant coarsening of the ferrite grains in the microstructure of the heat-affected zones produces a pronounced degradation in the impact toughness.

SUMMARY OF THE INVENTION

The object of the present invention is to provide line pipe having good corrosion-resistance and weldability. Another object of the present invention is to provide steel line pipe for transporting oil and natural gas, the steel pipe having good resistance to corrosion in an environment that includes wet carbon dioxide and trace amounts of wet hydrogen sulfide and the like, and good weldability with respect to circumferential welds performed in the field.

DETAILED DESCRIPTION OF THE INVENTION

The present inventors discovered that these specific characteristics of line pipe could be imparted by using low carbon, high chromium steel with good corrosion-resistance for at least the surface in contact with the corrosive fluid being transported, and by using low alloy steel having good strength and toughness for the substrate.

It was found that line pipe that has good corrosion-resistance and good weldability could be obtained by lining the inner surface of the line pipe that is in direct contact with the fluid being transported with high chromium linear material in which the carbon content has been minimized in order to reduce the increase in the hardness of welding heat-affected zones, and using high-strength, high-toughness low alloy steel for the substrate that is not in contact with the fluid being transported.

Based on further studies, the present inventors also found that using a chromium content of 7.5 to 16 percent and reducing the carbon content to no more than 0.03 percent and the nitrogen content to no more than 0.02 percent as the basic composition of the high chromium steel to obtain the above specific characteristics was highly effective for improving the corrosion-resistance and reducing the hardness of welding heat-affected zones.

Also, the corrosion-resistance in a wet carbon dioxide environment can be further improved by adding to the high chromium steel one, two or more elements selected from the group of nickel, copper, molybdenum, and tungsten. Corrosion-resistance is also enhanced by reducing the phosphorus content to no more than 0.02 percent and the sulfur content to no more than 0.005 percent.

In accordance with the present invention, it was also found that high chromium steel has good corrosion-resistance and toughness when it contains, in weight percent, one, two or more members selected from 0.01 to 1.0 percent niobium, 0.01 to 1.0 percent vanadium, 0.01 to 1.0 percent titanium, and 0.01 to 1.0 percent zirconium, and also satisfies the following equation.

$$(Nb/93)+(V/51)+(Ti/48)+(Zr/91)-1.5\{(C/12)+(N/14)\} \geq 0$$

After further studies, the inventors also found that with respect to the base material to which strength and toughness is to be imparted, that a suitable steel was one that had 0.02 to 0.2 percent carbon, 0.01 to 1.0 percent silicon, and 0.05 to 2.0 percent manganese, and in which phosphorus was reduced to no more than 0.015 percent and sulfur to no more than 0.005 percent. It was also found that the strength and toughness could be improved by providing the steel with one, two or more members selected from 0.01 to 0.15 percent niobium, 0.01 to 0.1 percent vanadium, 0.005 to 0.1 percent titanium, and 0.05 to 0.7 percent molybdenum.

Also according to the studies by the inventors, it was found that even with respect to high chromium steel, the welding heat-affected zones of which may not necessarily have good toughness, by keeping the proportion of the total thickness taken up by the high chromium steel to no more than 25 percent it is possible to use as the base material steel in which welding heat-affected zones exhibit good toughness, thereby making it possible to ensure the toughness of the welding heat-affected zones in the line pipe as a whole.

While the present invention is directed to line pipe in which high chromium steel is used for at least the surface in direct contact with the fluid being transported, needless to say, this is done in order to impart corrosion-resistance to the pipe to protect it from the corrosive fluid within the pipe and, therefore, it is imperative that high chromium steel be used for the inner surface. On the other hand, as there is no corrosive fluid flowing on the outer surface, it is not necessary for the outer surface to be made of high chromium steel. However, high chromium steel may also be used for the outer surface, either to ensure the corrosion-resistance of the outer surface or for reasons relating to production processes, and line pipe in which the outer surface is also formed of high chromium steel is also an object of the present invention.

What is important is to use high chromium steel, with its good corrosion-resistance, for the inner surface or for the inner and outer surfaces, and provide portions that are not in direct contact with the fluid being transported with steel having good weldability.

The reasons for the specified limitations on the compositional elements of the high chromium steel will now be explained.

Chromium is needed to impart corrosion-resistance in a wet carbon dioxide environment. A chromium content that is less than 7.5 percent provides insufficient corrosion-resistance. On the other hand, adding more than 16 percent produces a saturation effect and a pronounced degradation in toughness following welding, which is why an upper limit of 16 percent has been specified.

Silicon is a useful deoxidizing element, for which purpose at least 0.01 percent is required. As more than 1.0 percent silicon produces a pronounced degradation in the toughness of high chromium steel, 1.0 percent has been specified as the upper limit.

For deoxidization purposes and for the toughness of high chromium steel, at least 0.01 percent manganese is required. If more than 3.0 percent manganese is added, the result tends to be a saturation effect and, moreover, gives rise to problems during the steel production process such as evaporation of the manganese, so 3.0 percent has been specified as the upper limit.

In high chromium steel carbon produces a pronounced rise in the hardness of welding heat-affected zones and a degradation in the corrosion-resistance. An upper limit of 0.03 percent carbon has been specified to keep down the hardness of the welding heat-affected zones and to ensure the corrosion-resistance of the steel.

In high chromium steel nitrogen, like carbon, produces a pronounced rise in the hardness of welding heat-affected zones. Thus, an upper limit of 0.02 percent nitrogen has been specified to keep down the hardness of the welding heat-affected zones.

The above is the basic composition of the high chromium steel liner material used for at least the inner surface of the line pipe according to the present invention. In accordance with the present invention, however, if required the following elements may be added or reduced to produce a further enhancement of the properties.

Nickel provides a further increase in the corrosion-resistance of high chromium steel, but when the amount exceeds 4 percent there is a saturation effect, the cost is increased to no purpose, and the hardness of welding heat-affected zones is needlessly raised. Therefore, 4 percent has been specified as the upper limit for nickel.

Like nickel, copper provides a further increase in the corrosion-resistance of high chromium steel, but when the amount exceeds 4.5 percent there is a saturation effect and the hardness of welding heat-affected zones is needlessly raised. Therefore, 4.5 percent has been specified as the upper limit for copper.

Molybdenum also enhances the corrosion-resistance of high chromium steel, especially the resistance to pitting corrosion, but when the amount exceeds 2.5 percent there is a saturation effect, the cost is increased to no purpose and there is an excessive degradation in the toughness of welding heat-affected zones. Therefore, 2.5 percent has been specified as the upper limit for molybdenum.

Like molybdenum, tungsten enhances the corrosion-resistance of high chromium steel, especially the resistance to pitting corrosion, but when the amount exceeds 5 percent there is a saturation effect, the cost is increased to no purpose and there is an excessive degradation in the toughness of welding heat-affected zones. Therefore, 5 percent has been specified as the upper limit for tungsten.

By fixing carbon and nitrogen as carbides, niobium, vanadium, titanium, and zirconium reduce the hardness of welding heat-affected zones, and they enhance the corrosion-resistance. These effects are not achieved if the content is less than 0.01 percent, while a content that exceeds 1.0 percent increases the cost to no purpose and also causes roll marks and the like. Therefore, an upper limit of 1.0 percent has been specified. Furthermore, to effectively lower the hardness of welding heat-affected zones and produce a further improvement in corrosion-resistance, the total of the added niobium, vanadium, titanium and zirconium has to satisfy the following equation.

$$(Nb/93)+(V/51)+(Ti/48)+(Zr/91) -1.5\{(C/12)+(N/14)\} \geq 0$$

The presence of large amounts of phosphorus interferes with the corrosion-resistance of high chromium steel. Therefore, when a higher degree of corrosion-resistance is required an effective way to achieve it is to keep the phosphorus content to no more than 0.02 percent.

The presence of large amounts of sulfur interferes with the corrosion-resistance of high chromium steel, especially the resistance to pitting corrosion. Therefore, when a higher degree of corrosion-resistance is required a highly effective way to achieve it is to keep the sulfur content to no more than 0.005 percent.

Concerning other constituents of the high chromium steel, aluminum may be added as a deoxidizing agent, and calcium, boron, and rare earth elements also can be added, without departing from the gist of the invention.

The reasons for the specified limitations on the compositional elements of the base material will now be explained.

Carbon is needed to ensure the strength of the base material for line pipe applications. Sufficient strength will not be obtained if the content is less than 0.02 percent. However, a carbon content that exceeds 0.25 percent will degrade the impact toughness of welding heat-affected zones, so the upper limit has been set at 0.25 percent.

At least 0.01 percent silicon is required for deoxidization and strength enhancement, but more than 1.0 percent will degrade the ductility. Therefore, a silicon content of from 0.01 to 1.0 percent has been specified.

At least 0.05 percent manganese is required to strengthen the steel. More than 2.0 percent tends to cause a saturation effect, so the upper limit has been set at 2.0 percent.

Phosphorus causes loss of weldability and resistance to sulfide stress cracking in a wet hydrogen sulfide environment, and therefore should be restricted to no more than 0.005 percent.

Aluminum is required for its deoxidization effect, for which at least 0.005 percent aluminum is needed. However, an aluminum content of more than 0.10 percent will give rise to coarse inclusions and degrade impact toughness. Therefore, an aluminum content of from 0.005 to 0.10 percent has been specified.

The above is the basic composition of the substrate material not in direct contact with the fluid being transported, for use as the basic material of the line pipe. In accordance with the present invention, however, if required the following elements may be added or reduced to produce a further improvement in the properties thereof.

By contributing to grain refinement niobium improves impact toughness, for which at least 0.01 percent is required. However, exceeding 0.15 percent niobium causes a saturation effect and increases the cost to no purpose, so 0.15 percent has been set as the upper limit.

Vanadium also contributes to grain refinement and improves the strength of the steel. To achieve this, at least 0.01 percent vanadium is required. However, exceeding 0.1 percent vanadium causes a saturation effect and increases the cost to no purpose, so 0.1 percent has been set as the upper limit.

Titanium contributes to grain refinement and thereby improves impact toughness. To achieve this effect adequately, at least 0.005 percent titanium is required. However, a titanium content that exceeds 0.1 percent causes a saturation effect and increases the cost to no purpose, so 0.1 percent has been set as the upper limit for the titanium content.

Molybdenum improves the strength of the base material. To obtain this effect adequately, at least 0.05 percent molybdenum is required. However, a molybdenum content that exceeds 0.7 percent causes a saturation effect and increases the cost to no purpose, so 0.7 percent has been set as the upper limit for the molybdenum content.

Chromium, nickel, copper, boron, and nitrogen are not essential constituents of the present invention, but may be optionally added to increase the strength of the steel. In the same way, zirconium may be added for deoxidization purposes, and calcium or rare earth elements may be added to control the shape of non-metallic inclusions.

In the present invention, the proportion of the total thickness taken up by the high chromium steel is limited to a maximum of 25 percent. The reason for this limitation is that if the proportion exceeds 25 percent it becomes difficult to ensure the toughness of welding heat-affected zones of the line pipe, no matter how tough a steel substrate is used. It is therefore necessary to ensure that at least 75 percent of the thickness is constituted by base material that will provide good toughness with respect to welding heat-affected zones.

In the present invention there is no particular limitation on the production method to be used, so long as high chromium steel is used for at least the inner surface in direct contact with the fluid being transported, the substrate not in direct contact with the fluid has the composition described above, and the high chromium steel constitutes no more than 25 percent of the total thickness.

For example, molten high chromium steel and ordinary steel may be cast simultaneously to form a composite slab in which the high chromium steel is used for the outer surface and the ordinary steel for the core, and the slab then hot rolled to a plate, which is formed into pipes by an ordinary UOE process or electric-resistance welded to form electric-resistance welded pipes. Or, the molten high chromium steel and ordinary steel may be cast simultaneously to form a composite bloom in which the high chromium steel is used for the core and the ordinary steel for the outer surface, and the bloom is then hot rolled or hot-extruded to form seamless pipes.

The present invention provides line pipe having good corrosion-resistance in a wet carbon dioxide environment and good weldability, and thereby makes a major contribution to industrial development.

EXAMPLE 1

Composite slabs or blooms having the compositions listed in Table 1 were manufactured and used to produce pipes 10 to 20 mm thick. Table 1 also lists the proportion of the total thickness of the pipes accounted for by the thickness of the high chromium steel portion (hereinafter referred to as "liner material").

The pipes were subjected to manual circumferential welding to form joints corresponding to line pipe field weld portions. Welding heat input was 17 kJ/cm. Impact tests were conducted on JIS No. 4 impact test specimens (full size) obtained from the base material and from the circumferential welding heat-affected zones. Also, Vickers microhardness measurements were conducted with a 100 g load to obtain the maximum hardness of welding heat-affected zones.

Corrosion in a wet carbon dioxide environment was tested by immersing specimens of liner material for 30 days in an aqueous solution containing 3 percent sodium chloride under a pressure of 40 atmospheres of carbon dioxide in an autoclave maintained at the test temperature of 120° C. The rate of corrosion was calculated based on the weight loss of each specimen during the test. The corrosion rate was expressed in millimeters per year (mm/y), and a corrosion rate not exceeding 0.1 mm/y was considered to indicate that in that environment the material concerned has sufficient corrosion-resistance to be usable.

The test results are listed in Table 1. With respect to the impact test results listed in Table 1, ∘∘ indicates a fracture appearance transition temperature of not higher −40° C., ○ indicates a fracture transition temperature that is over −40° C. but does not exceed −20° C., X indicates a fracture transition temperature that is both being conventional steels that are used in a wet carbon dioxide environment. For the purposes of comparison, test samples of steel No. 9 and No. 10 are single tubes.

TABLE 1

| | | | Chemical Composition (Wt %) | | | | | | | | | | | | |
|---|---|---|---|---|---|---|---|---|---|---|---|---|---|---|---|
| | | | C | Si | Mn | P | S | Cr | N | Al | Ni | Cu | Mo | W | Nb | V | Ti |
| Inventive steels | 1 | Liner | 0.012 | 0.11 | 0.54 | N.A. | N.A. | 12.8 | 0.007 | — | — | — | — | — | — | — | — |
| | | Substrate | 0.08 | 0.23 | 1.55 | 0.012 | 0.003 | — | — | 0.025 | — | — | — | — | — | — | — |
| | 2 | Liner | 0.010 | 0.08 | 0.43 | 0.017 | 0.002 | 12.5 | 0.005 | — | — | — | — | — | — | — | — |
| | | Substrate | 0.07 | 0.25 | 1.60 | 0.008 | 0.001 | — | — | 0.033 | — | — | — | — | — | — | — |
| | 3 | Liner | 0.020 | 0.27 | 0.66 | 0.013 | 0.002 | 10.3 | 0.012 | — | 2.1 | — | — | — | — | — | — |
| | | Substrate | 0.06 | 0.10 | 1.38 | 0.007 | 0.001 | — | — | 0.030 | — | — | — | — | 0.042 | — | — |
| | 4 | Liner | 0.008 | 0.13 | 0.77 | 0.010 | 0.002 | 12.4 | 0.010 | — | — | 1.5 | 1.2 | — | — | — | — |
| | | Substrate | 0.06 | 0.25 | 1.88 | 0.010 | 0.003 | — | — | 0.018 | — | — | — | — | — | 0.045 | 0.022 |
| | 5 | Liner | 0.010 | 0.24 | 0.33 | N.A. | N.A. | 12.2 | 0.012 | — | 1.7 | — | 0.50 | 1.3 | — | — | — |
| | | Substrate | 0.10 | 0.31 | 1.59 | 0.012 | 0.001 | — | — | 0.029 | — | — | 0.50 | — | 0.036 | — | — |
| | 6 | Liner | 0.017 | 0.10 | 0.53 | 0.018 | 0.001 | 11.9 | 0.010 | — | — | — | 0.88 | 0.14 | — | — | — |
| | | Substrate | 0.09 | 0.18 | 1.86 | 0.007 | 0.002 | — | — | 0.032 | — | — | — | — | 0.035 | 0.027 | 0.019 |
| | 7 | Liner | 0.012 | 0.22 | 0.51 | 0.011 | N.A. | 12.2 | 0.007 | — | 1.3 | — | 1.1 | — | — | — | — |
| | | Substrate | 0.06 | 0.25 | 1.48 | 0.011 | 0.001 | — | — | 0.015 | — | — | 0.61 | — | — | 0.034 | 0.020 |
| | 8 | Liner | 0.014 | 0.18 | 1.76 | 0.018 | 0.001 | 12.0 | 0.011 | — | — | — | — | 1.2 | — | — | — |
| | | Substrate | 0.07 | 0.28 | 1.55 | 0.012 | 0.002 | — | — | 0.022 | — | — | — | — | 0.037 | 0.032 | 0.021 |
| Comparative steels | 9 | Single tube | 0.19 | 0.30 | 0.53 | 0.019 | 0.004 | 13.1 | 0.022 | — | 0.3 | — | — | — | — | — | — |
| | 10 | Single tube | 0.12 | 0.25 | 0.62 | 0.018 | 0.004 | 9.1 | 0.020 | — | — | — | 0.9 | — | — | — | — |
| | 11 | Liner | 0.066 | 0.33 | 0.45 | 0.015 | 0.003 | 13.2 | 0.034 | — | 1.2 | — | 0.4 | — | — | — | — |
| | | Substrate | 0.10 | 0.30 | 1.24 | 0.011 | 0.003 | — | — | 0.031 | — | — | — | — | 0.026 | — | — |
| | 12 | Liner | 0.075 | 0.32 | 1.38 | 0.019 | 0.003 | 13.3 | 0.042 | — | — | 1.5 | — | 0.7 | — | — | — |
| | | Substrate | 0.12 | 0.18 | 1.02 | 0.015 | 0.004 | — | — | 0.052 | — | — | 0.3 | — | 0.031 | — | 0.020 |
| | 13 | Liner | 0.012 | 0.29 | 0.37 | 0.018 | 0.004 | 13.8 | 0.019 | — | — | — | — | — | — | — | — |
| | | Substrate | 0.11 | 0.20 | 0.88 | 0.014 | 0.003 | — | — | 0.033 | — | — | 0.4 | — | — | — | — |

| | | | Location of liner | Thickness (mm) | Substrate thickness (mm) | Thickness of liner as proportion of total thickness (%) | Maximum hardness of welded portions | Impact toughness of welded portions | Corrosion resistance |
|---|---|---|---|---|---|---|---|---|---|
| Inventive steels | 1 | Liner Substrate | Inner surface | 1.2 | 10.2 | 11 | ○○ | ○ | ○○ |
| | 2 | Liner Substrate | Inner surface | 1.2 | 9.7 | 12 | ○○ | ○ | ○○ |
| | 3 | Liner Substrate | Inner and outer surfaces | Inner: 1.3 Outer: 1.2 | 11.5 | 18 | ○○ | ○ | ○ |
| | 4 | Liner Substrate | Inner and outer surfaces | Inner: 1.0 Outer: 1.1 | 8.9 | 19 | ○○ | ○○ | ○○ |
| | 5 | Liner Substrate | Inner surface | 1.8 | 8.5 | 17 | ○ | ○○ | ○○ |
| | 6 | Liner Substrate | Inner surface | 2.0 | 10.7 | 16 | ○ | ○○ | ○○ |
| | 7 | Liner Substrate | Inner and outer surfaces | Inner: 1.7 Outer: 1.6 | 13.2 | 20 | ○ | ○ | ○○ |
| | 8 | Liner Substrate | Inner surface | 1.8 | 8.7 | 17 | ○ | ○○ | ○○ |
| Comparative steels | 9 | Single tube | Single tube | 12.7 | — | 100 | XX | XX | X |
| | 10 | Single tube | Single tube | 10.5 | — | 100 | XX | XX | XX |
| | 11 | Liner Substrate | Inner surface | 2.1 | 10.2 | 17 | XX | ○ | ○ |
| | 12 | Liner Substrate | Inner and outer surfaces | Inner: 1.8 1.6 | 9.5 | 26 | XX | X | X |
| | 13 | Liner Substrate | Inner and outer surfaces | Outer: 3.1 2.9 | 5.1 | 54 | ○ | XX | ○ |

Note: N.A. signifies "Not Analyzed."

over −20° C. but does not exceed 0° C., and XX indicates a fracture transition temperature that is over 0°C. With respect to the maximum hardness of welding heat-affected zones, ○○ indicates a maximum hardness that is less than Hv 250, ○ indicates a maximum hardness that is over Hv 250 but less than Hv 280, X indicates a maximum hardness that is over Hv 280 but less than Hv 400, and XX indicates a maximum hardness of Hv 400 or more. With respect to the corrosion tests, ○○ indicates a corrosion rate of less than 0.05 mm/y, ○ indicates a corrosion rate of from 0.05 mm/y to less than 0.1 mm/y, X indicates a corrosion rate of from 0.1 mm/y to less than 0.5 mm/y, and XX indicates a corrosion rate of 0.5 mm/y or more.

In Table 1 comparative steel No. 9 is AISI Type 420 steel and comparative steel No. 10 is 9Cr—1Mo steel, From Table 1 it can be seen that inventive line pipes Nos. 1 to 8 show superior impact toughness of the base metal and welding heat-affected zones, adequately low hardness of the heat-affected zones, and a rate of corrosion in a wet carbon dioxide environment that even at 120° C., which is a very high temperature for a line pipe, is below the rate of 0.1 mm/y that is considered usable in practice, which means that these inventive line pipes have good corrosion-resistance and weldability.

In contrast, the welded portions of comparative samples No. 9 and No. 10 have weld cracks and show a very high maximum hardness. Also, because comparative samples Nos. 11 to 13 do not satisfy the requirements according to the present invention, they are inferior in terms of the hardness and impact toughness of their welding heat-affected zones.

EXAMPLE 2

Composite slabs or blooms having the compositions listed in Table 2 were manufactured and used to produce the listed pipes with thicknesses ranging from 10 to 20 mm. Table 2 also lists the proportion of the total thickness of the pipes accounted for by the thickness of the liner material portion.

The procedures used in Example 1 were also used to conduct impact and corrosion tests and to measure the maximum hardness of the welding heat-affected zones of Example 2.

The test results are listed in Table 2, with the same expressions as Example 1 for the impact test results, the maximum hardness of welding heat-affected zones, and the corrosion test results.

TABLE 2

| | | | Chemical Composition (Wt %) | | | | | | | | | | | | | | |
|---|---|---|---|---|---|---|---|---|---|---|---|---|---|---|---|---|---|
| | | | C | Si | Mn | P | S | Cr | N | Al | Ni | Cu | Mo | W | Nb | V | Ti | Zr |
| Inventive steels | 14 | Liner | 0.010 | 0.10 | 0.44 | N.A. | N.A. | 11.7 | 0.008 | — | — | — | — | — | 0.33 | — | — | — |
| | | Substrate | 0.07 | 0.20 | 1.44 | 0.013 | 0.002 | — | — | 0.035 | — | — | — | — | — | — | — | — |
| | 15 | Liner | 0.011 | 0.14 | 0.55 | 0.011 | 0.001 | 12.7 | 0.006 | — | — | — | — | — | — | 0.20 | 0.15 | — |
| | | Substrate | 0.07 | 0.20 | 1.50 | 0.006 | 0.002 | — | — | 0.030 | — | — | — | — | — | — | — | — |
| | 16 | Liner | 0.016 | 0.11 | 0.48 | N.A. | 0.002 | 11.8 | 0.010 | — | 1.9 | — | — | — | — | — | 0.24 | 0.06 |
| | | Substrate | 0.07 | 0.34 | 1.57 | 0.008 | 0.001 | — | — | 0.030 | — | — | — | — | 0.042 | — | — | — |
| | 17 | Liner | 0.007 | 0.08 | 0.40 | 0.014 | 0.002 | 13.2 | 0.007 | — | — | 1.6 | 1.1 | — | 0.25 | — | — | 0.05 |
| | | Substrate | 0.08 | 0.21 | 1.46 | 0.009 | 0.001 | — | — | 0.026 | — | — | — | — | — | 0.032 | 0.019 | — |
| | 18 | Liner | 0.012 | 0.16 | 0.65 | 0.013 | N.A. | 10.5 | 0.010 | — | 1.8 | — | 0.9 | — | — | — | 0.08 | — |
| | | Substrate | 0.09 | 0.29 | 1.03 | 0.007 | 0.002 | — | — | 0.039 | 0.3 | — | 0.61 | — | 0.036 | — | 0.020 | — |
| | 19 | Liner | 0.018 | 0.13 | 0.35 | 0.013 | N.A. | 12.5 | 0.012 | — | — | — | 0.80 | 0.34 | 0.16 | 0.21 | 0.06 | — |
| | | Substrate | 0.06 | 0.21 | 1.76 | 0.013 | 0.002 | — | — | 0.032 | — | — | — | — | 0.033 | 0.041 | 0.017 | — |
| | 20 | Liner | 0.014 | 0.13 | 0.36 | 0.013 | 0.002 | 13.0 | 0.009 | — | 1.3 | — | 1.1 | — | — | — | — | — |
| | | Substrate | 0.08 | 0.20 | 1.31 | 0.012 | 0.002 | — | — | 0.015 | — | — | 0.61 | — | — | 0.034 | 0.020 | — |
| | 21 | Liner | 0.012 | 0.10 | 1.56 | 0.011 | 0.002 | 12.5 | 0.010 | — | 2.2 | — | 1.0 | 0.6 | 0.28 | — | 0.08 | — |
| | | Substrate | 0.07 | 0.25 | 1.40 | 0.012 | 0.003 | — | — | 0.031 | — | — | — | — | 0.031 | 0.027 | 0.016 | — |
| Comparative steels | 22 | Single tube | 0.21 | 0.33 | 0.53 | 0.019 | 0.004 | 13.1 | 0.022 | — | 0.2 | — | — | — | — | — | — | — |
| | 23 | Single tube | 0.12 | 0.25 | 0.62 | 0.018 | 0.004 | 9.1 | 0.020 | — | — | — | 0.9 | — | — | — | — | — |
| | 24 | Liner | 0.083 | 0.25 | 1.40 | 0.014 | 0.003 | 13.1 | 0.029 | — | 1.0 | — | 0.3 | — | — | 0.025 | — | — |
| | | Substrate | 0.11 | 0.32 | 1.03 | 0.016 | 0.002 | — | — | 0.032 | — | — | — | — | 0.028 | — | 0.015 | — |
| | 25 | Liner | 0.073 | 0.29 | 0.54 | 0.014 | 0.003 | 13.2 | 0.053 | — | — | — | 0.9 | — | 0.033 | — | — | — |
| | | Substrate | 0.11 | 0.32 | 1.03 | 0.015 | 0.002 | — | — | 0.029 | — | — | 0.2 | — | — | — | 0.023 | — |
| | 26 | Liner | 0.015 | 0.25 | 0.40 | 0.014 | 0.003 | 13.7 | 0.016 | — | — | — | — | — | 0.22 | — | 0.11 | — |
| | | Substrate | 0.10 | 0.30 | 0.78 | 0.013 | 0.002 | — | — | 0.061 | — | — | 0.3 | — | — | — | — | — |

| | | | Value of equation (1) | Location of liner | Thickness (mm) | Substrate thickness (mm) | Thickness of liner as proportion of total thickness (%) | Maximum hardness of welded portions | Impact toughness of welded portions | Corrosion resistance |
|---|---|---|---|---|---|---|---|---|---|---|
| Inventive steels | 14 | Liner Substrate | $1.44 \times 10^{-3}$ | Inner and outer surfaces | Inner: 1.1 Outer: 1.2 | 10.5 | 18 | ○○ | ○ | ○○ |
| | 15 | Liner Substrate | $5.03 \times 10^{-3}$ | Inner surface | 1.2 | 12.7 | 8.6 | ○○ | ○○ | ○○ |
| | 16 | Liner Substrate | $2.59 \times 10^{-3}$ | Inner surface | 1.4 | 9.6 | 13 | ○○ | ○ | ○○ |
| | 17 | Liner Substrate | $1.61 \times 10^{-3}$ | Inner and outer surfaces | Inner: 1.3 Outer: 1.2 | 10.5 | 19 | ○○ | ○○ | ○○ |
| | 18 | Liner Substrate | $1.18 \times 10^{-3}$ | Inner and outer surfaces | Inner: 1.2 Outer: 1.0 | 12.7 | 15 | ○○ | ○○ | ○○ |
| | 19 | Liner Substrate | $3.55 \times 10^{-3}$ | Inner and outer surfaces | Inner: 1.5 Outer: 1.5 | 15.3 | 16 | ○ | ○○ | ○○ |
| | 20 | Liner Substrate | $2.70 \times 10^{-3}$ | Inner surface | 1.9 | 12.0 | 14 | ○ | ○○ | ○○ |
| | 21 | Liner Substrate | $2.54 \times 10^{-3}$ | Inner surface | 2.0 | 10.0 | 17 | ○ | ○○ | ○○ |
| Comparative steels | 22 | Single tube | $-2.87 \times 10^{-2}$ | Single tube | 12.7 | — | 100 | XX | XX | X |
| | 23 | Single tube | $-1.71 \times 10^{-2}$ | Single tube | 10.5 | — | 100 | XX | XX | XX |
| | 24 | Liner Substrate | $-1.25 \times 10^{-2}$ | Inner surface | 2.0 | 9.0 | 18 | XX | ○ | X |
| | 25 | Liner Substrate | $-1.41 \times 10^{-2}$ | Inner and outer surfaces | Inner: 1.6 Outer: 1.7 | 10.3 | 26 | XX | X | X |
| | 26 | Liner Substrate | $1.07 \times 10^{-3}$ | Inner and outer surfaces | Inner: 3.5 Outer: 3.4 | 4.4 | 61 | ○ | XX | ○ |

Note: N.A. signifies "Not Analyzed."
Note: Equation (1): $(Nb/93) + (V/51) + (Ti/48) + (Zr/91) - 1.5\{(C/12) + (N/14)\} \geq 0$ From Table 2 it is obvious that inventive line pipes Nos. 14 to 21 exhibit superior impact toughness of the base metal and welding heat-affected zones, adequately low hardness of the heat-affected zones, and a rate of corrosion in a wet carbon dioxide environment that even at 120° C., which is a very high temperature for a line pipe, is below the rate of 0.1 mm/y that is considered usable in practice, which means that these inventive line pipes have good corrosion-resistance and weldability.

In contrast, the welded portions of comparative samples No. 22 and No. 23 show weld cracks and a very high maximum hardness. Also, because comparative samples Nos. 24 to 26 do not satisfy the requirements according to the present invention, they are inferior in terms of the hardness and impact toughness of their welding heat-affected zones.

What is claimed is:

1. Line pipe having good corrosion-resistance and weldability, comprising:

liner material on at least the line pipe inner surface in direct contact with a fluid being transported, said liner material being formed of high chromium steel consisting essentially of, by weight percent, 7.5 to 16 percent chromium, 0.01 to 1.0 percent silicon, 0.01 to 3.0 percent manganese, a carbon content reduced to no more than 0.03 percent, a nitrogen content reduced to no more than 0.02 percent, with the balance of iron and unavoidable impurities; and a substrate that is not in direct contact with the fluid being transported, said substrate being formed of steel consisting essentially of 0.02 to 0.25 percent carbon, 0.1 to 1.0 percent silicon, 0.05 to 2.0 percent manganese, 0.005 to 0.1 percent aluminum, a phosphorus impurity content reduced to no more than 0.015 percent and a sulfur impurity content reduced to no more than 0.005 percent, with the balance of iron and unavoidable impurities; and the thickness of the high chromium steel does not exceed 25 percent of the total thickness of said pipe;

whereby said substrate has adequate strength and superior impact toughness of a welding heat-affected zone, and said liner material has good corrosion-resistance and adequately low hardness of a welding heat-affected zone.

2. The line pipe according to claim 1, in which the high chromium steel further consists essentially of one, two or more members selected from up to 4 percent nickel, up to 4.5 percent copper, up to 2.5 percent molybdenum, and up to 5 percent tungsten.

3. The line pipe according to claim 1, in which the high chromium steel further consists essentially of one, two or more members selected from 0.01 to 1.0 percent niobium, 0.01 to 1.0 percent vanadium, 0.01 to 1.0 percent titanium, and 0.01 to 1.0 percent zirconium, and also satisfies the equation $$(Nb/93)+(V/51)+(Ti/48)+(Zr/91)-1.5\{(C/12)+(N/14)\} \geq 0.$$

4. The line pipe according to claim 1, in which in the high chromium steel the phosphorus impurity content is reduced to no more than 0.02 percent and the sulfur impurity content is reduced to no more than 0.005 percent.

5. The line pipe according to claim 1, in which the substrate steel that is not in direct contact with the fluid being transported further consists essentially of one, two or more members selected from 0.01 to 0.15 percent niobium, 0.01 to 0.1 percent vanadium, 0.005 to 0.1 percent titanium, and 0.05 to 0.7 percent molybdenum.

6. The line pipe according to claim 1, in which the substrate not in direct contact with the fluid being transported is used as a core material and the high chromium steel liner material is used for the inner surface in direct contact with the fluid being transported and the outer surface of the core material.

7. The line pipe according to claim 2, in which the high chromium steel further consists essentially of one, two or more members selected from 0.01 to 1.0 percent niobium, 0.01 to 1.0 percent vanadium, 0.01 to 1.0 percent titanium, and 0.01 to 1.0 percent zirconium, and also satisfies the equation $$(Nb/93)+(V/51)+(Ti/48)+(Zr/91)-1.5\{(C/12)+(N/14)\} \geq.$$

8. The line pipe according to claim 2, in which the substrate steel that is not in direct contact with the fluid being transported further consists essentially of one, two or more members selected from 0.01 to 0.15 percent niobium, 0.01 to 0.1 percent vanadium, 0.005 to 0.1 percent titanium, and 0.05 to 0.7 percent molybdenum.

* * * * *